July 15, 1969  M. N. KNUTSEN, JR  3,455,048
ROTARY BRAILER
Filed Jan. 5, 1968
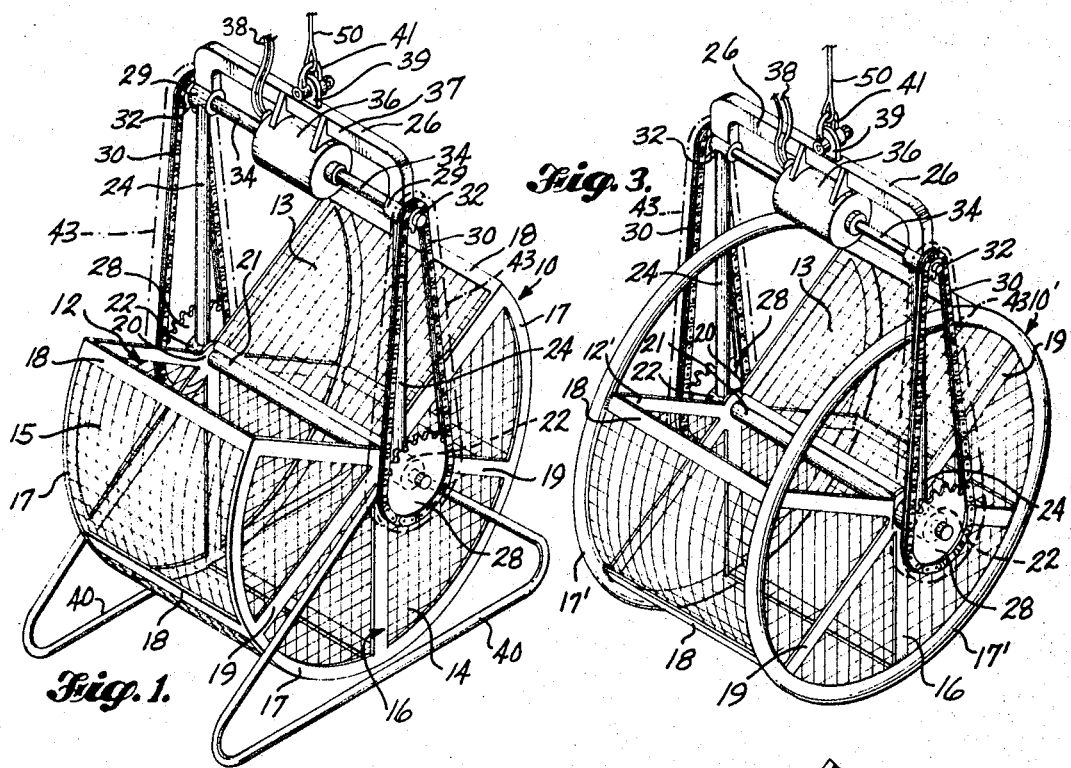
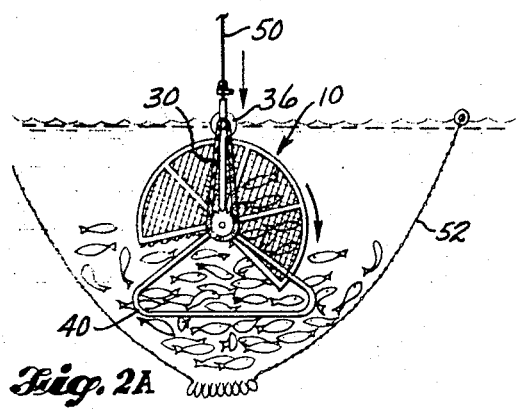
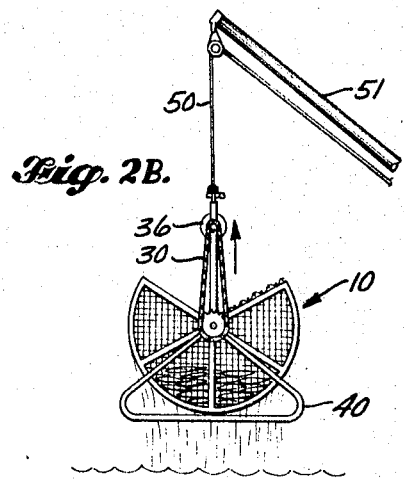
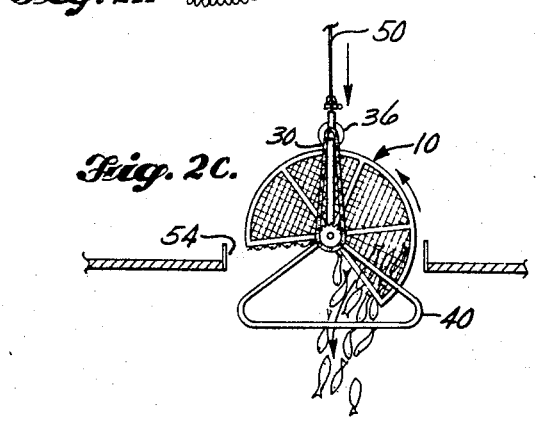
INVENTOR.
MORRIS N. KNUTSEN JR.
BY Graybeal, Cole, & Barnard
ATTORNEYS

United States Patent Office 3,455,048
Patented July 15, 1969

3,455,048
ROTARY BRAILER
Morris N. Knutsen, Jr., Rte. 1, Box 218,
Silverdale, Wash. 98383
Filed Jan. 5, 1968, Ser. No. 695,965
Int. Cl. *A01k 75/00*
U.S. Cl. 43—6.5
10 Claims

ABSTRACT OF THE DISCLOSURE

A rotatable wire-mesh basket in the form of a cylinder with a wedge-shaped sector removed. One side of the sector is open to provide a combined inlet and outlet. The basket is supported by a frame which also supports a reversible motor and drive train means interconnecting the motor and the basket. The basket is lowered by a boom line into the net, with the open sector directed downwardly, and is then rotated, with the inlet-outlet opening leading, to scoop up fish. It is then lifted by the boom, with the open sector directed upwardly, is swung over to a position above the receiving station aboard the vessel, and is rotated again to dump the fish.

BACKGROUND OF THE INVENTION

Field of the invention

The present invention realtes to fishing equipment, and more particularly to a brailer for removing fish from a seine net, or the like, and transferring them to a receiving station aboard a fishing vessel.

Description of the prior art

In seine fishing it is customary to haul the net and its catch in toward the vessel, and then remove the fish from the net by the use of a shallow, basket-like device attached to a long handle. This device, termed a "brailer" is manipulated by two or three men standing in a small boat positioned alongside both the net and the vessel. These men manually move the head of the brailer into the mass of fish in the net. Then, the brailer is hauled aboard the vessel by means of a boom line attached to an intermediate portion of its handle. This operation is quite slow and requires great experience and tremendous strength. It is expensive because several men are required to manipulate the brailer. Also, it is dangerous because the small boat, the vessel, and net are usually pitching heavily in the sea.

Several power operated mechanisms have been developed to modernize this procedure. Generally speaking, they are of two types. An example of the first type is disclosed by Learch, U.S. Patent No. 3,314,184. It is basically a hydraulic type dredging system. The fish are removed from the net by pumping them through a conduit to the receiving station about the vessel. One disadvantage of this system is that it is quite expensive and cannot be afforded by a large number of vessel owners. Another is that a considerable amount of unwanted water is pumped aboard the vessel along with the fish. Also, present fish pump systems are limited in the size of fish they can handle to fish measuring no more than about twelve inches in length. The second type of mechanism is a "clamshell" type of lifting device having basket-like jaws. Examples of such mechanism are disclosed by Puretic, U.S. Patent No. 3,058,247, and Puretic, U.S. Patent No. 3,091,879. In operation, a mechanism of this type is lowered into the net with its jaws open. The jaws are then closed about the fish caught between them. Next the "clamshell" and entrapped fish are raised by a boom line and the boom is swung over the hatch leading into the hold of the fishing vessel, and then the "clamshell" is reopened to release the fish. A principal disadvantage of this type of mechanism is that the number of fish that can be picked up with each succeeding pass becomes fewer and fewer as the net is emptied. The depth of fish entrapped between the jaws is the same as the depth of fish in the net which eventually is less than the height of the jaws. It does not help to reopen the jaws and take a larger bit because this just results in the fish already entrapped being released. Also, the jaws cannot be used too close to the wall of the net or they will grab onto the netting.

SUMMARY OF THE INVENTION

Brailers of the present invention are basically characterized by a rigid basket of wire mesh having a generally tangentially directed inlet-outlet opening. In use it is lowered into the net and rotated to entrap fish caught in its path. When filled the basket is raised by a boom line and repositioned over a receiving receptacle (e.g., the ship's hold) aboard the vessel. Then, the basket is rotated into an upside down position to release the fish into the receptacle. As will be evident, the basket is not drawn open or closed and requires for its operation only a simple rotational drive mechanism. It is thus simple to operate, easily stored and inexpensive to manufacture.

These and other inherent objects, features, advantages and characteristics of the present invention will be apparent from the following description of typical and therefore nonlimitive embodiments of the invention, as described below in conjunction with the accompanying illustrations.

BRIEF DESCRIPTION OF THE DRAWING

In the drawing like element designations refer to like parts, and:

FIG. 1 is an isometric view of a first preferred form of brailer according to the invention, showing the chain guards or housing in phantom;

FIG. 2A is a first operational view showing the brailer being lowered into a mass of fish in a pursed seine net, open part downwardly;

FIG. 2B is a second operational view showing the brailer being raised with a load of the fish and the open part directed upwardly;

FIG. 2C is a third operational view showing the brailer positioned over the hold of the fishing vessel and being rotated to release the fish; and FIG. 3 is a second preferred form of brailer embodying the principles of the invention.

DESCRIPTION OF THE PREFERRED EMBODIMENTS

The brailer shown by FIG. 1 comprises a basket 10 in the form of a right cylinder minus a wedge-shaped sector portion of about 150° in angular length. One side or angular boundary of the sector is open to provide a combined inlet-outlet opening 12. The other side of the sector, and the sides and periphery of the basket 10, are enclosed by walls 13, 14, 15 of a previous sheet material, such as one-inch hardware cloth, for example.

Basket 10 includes a skeleton frame 16 to which the wall material is secured. By way of typical and therefore nonlimitive example, frame 16 is shown to comprise a pair of circumferential ribs 17, interconnected by a plurality of axial supports 18, and a plurality of radial supports 19 connected between the circumferential members 17 and a pair of hubs 20. The hubs 20 are themselves interconnected by a rigid center shaft 21 that is fixed to, and rotates with, the frame 16.

The two end portions of the shaft 21 project outwardly beyond the side walls 14 of the basket 10 and through bearings or bushings positioned in cylindrical support sleeves 22 located at the lower, free ends of side arm portions 24 of an inverted, U-shaped main frame 26.

A sprocket 28 is keyed or otherwise secured to each end portion of the shaft 21, outboardly of the support sleeves 22. A second set of support sleeves 29 are integrated into the side arm portions 24 near the upper end of the main frame 26. A reversible hydraulic motor 36 or its equivalent is affixed to, and depends below, a cross head portion 37 of the main frame 26. The motor 36 is preferably centered with respect to the brailer as a whole so that its weight is balanced. The motor 36 comprises an output shaft 34 extending outwardly of each of its ends, then through bearings or bushings located in the support sleeves 29, and then outwardly a short distance further beyond the side arms 24. A pair of chain sprockets 32 are affixed to the outboard end portions of the shafts 34 and are substantially in coplanar parallelism with the lower sprockets 28. Each pair of sprockets 28, 32 are interconnected by a drive chain 30 to complete a drive train extending from the motor 36 to the basket 10. The drive chains 30 and their sprockets 28, 32 are enclosed by sheet metal or wire casings, the outlines only of which are shown in the drawing by broken lines 43.

An eye member 39 is secured to the upper center portion of the cross member 37 to receive a shackle coupler 41 used for connecting the eye member 39 to the lower eye portion of a lifting line 50.

The embodiment of FIG. 1 further includes a pair of side located subframes 40 which function both as guards for spacing the rotating basket away from the walls of the net 52, during periods of brailer use, and as a stand for supporting the brailer on the deck of the vessel during periods of nonuse. The subframes 40 may be fabricated from tubular or cylindrical bar stock bent into the triangular shape illustrated. They may be secured to the nonrotating portion of the brailer by welding the upper free ends of the material used to support sleeves 22.

In operation, the brailer is lowered into the pursed net 52, which is located closely adjacent the fishing vessel (not shown), by a single line 50 depending from the vessel's boom. The basket 10 is oriented in an upside down position and as it is being lowered may be rocked back-and-forth slightly, by the reversible hydraulic motor 36, to cause it to sink into the body of fish entrapped in the net 52. Once the basket 10 is sufficiently submerged in the fish it is rotated through the fish into an upright position, and is then lifted by the boom line 50 out from the net 52. Next the boom 51 is swung sideways and otherwise manipulated to place the brailer over the deck opening 54 leading into the hold of the vessel. Then the basket 10 is rotated in the reverse direction to allow the fish therein to gravitate out of the basket 10 via the inlet-outlet opening 12 and into the hold. If desired, a tag line (not shown) can be attached to cross frame 37 and employed in the conventional manner to prevent rotation of the brailer about the lifting line 50.

As clearly shown by FIG. 2A, the subframes 49 depend downwardly beyond the peripheral boundaries of the basket 10 so that when the basket is being used in a nearly empty net the subframes 40 will contact the bottom of the net 52 and maintain it spaced from the leading edge of the rotating basket 10. When operating near the bottom of the net it may be necessary to rotate the basket 10 several times in order to accumulate a justifiable load of fish. This is one of the advantages of the brailer of this invention in that it is constructed so that multiple passes (i.e., multiple rotations) may be made at the fish in the net without losing the fish that have already been accumulated in the basket 10. This is not a capability possessed by the clam shell type of brailers which due to their construction must drop their load each time the two jaws thereof are opened.

FIG. 3 shows a second preferred form of brailer which is basically like the first form, the only difference being that the subframes 40 are eliminated and the circumferential ribs 17' are constructed in the form of complete rings made from a material having a rounded cross section, so as to provide smoothly rounded surfaces to the net. The axial supports 18 and the radial supports 19 are offset inwardly from the radial and side boundaries, respectively, of the rings 17'. Thus, during normal rotation of the basket 10' only the rings 17' will contact the walls of the net 52.

Although the invention has been described in its preferred forms, it is to be understood that changes in the various details which have been illustrated and described may be made without departing from the principles of the invention. For example, the basket may be constructed to have a peripheral boundary of spiral form. In other words, the inner edge of the inlet-outlet opening is spaced radially outwardly from the center axis, and the radial spacing of such boundary progressively increases over the entire 360° around the basket to the outer boundary of such opening, which lies in the same axial plane as the inner boundary. Further modifications include substituting a line controlled mechanical drive system for rotating the basket for the motor.

What is claimed is:

1. A brailer for removing fish from a net, comprising:
   (a) a frame;
   (b) a rotatable basket composed of peripheral and side wall means formed from a pervious material, said basket including a combined inlet-outlet opening facing in one direction of rotation of the basket;
   (c) means extending from a central portion of said side wall means mounting said basket on said frame for rotation about a generally horizontal axis;
   (d) means for connecting said frame to a lifting line; and
   (e) means for rotating said basket with its inlet-outlet opening leading.

2. A brailer according to claim 1, wherein the means for rotating said basket is reversible.

3. A brailer according to claim 2, wherein said means for rotating said basket is a reversible hydraulic motor.

4. A brailer according to claim 1, further including guard means contactable with the net for preventing the peripheral and/or side wall means from contacting the net during normal rotation of the basket.

5. A brailer according to claim 4, wherein said guard means comprises a pair of smooth surfaced subframes connected to said frame, one laterally outwardly of each side wall means of said basket, said subframes having portions which project outwardly of the horizontal axis beyond the peripheral wall means of said basket.

6. A brailer according to claim 5, wherein said portions of said subframes are shaped to provide a base for setting the brailer down on.

7. A brailer according to claim 4, wherein said guard means comprises a pair of cross-sectionally rounded runners circumscribing the basket on opposite sides thereof.

8. A brailer according to claim 1, wherein said basket is generally in the form of a right cylinder having a wedge-shaped sector removed, with one side of sector being open and constituting the inlet-outlet opening, and with the other side being closed by a wall of pervious material.

9. A brailer according to claim 1, wherein said frame is in the form of an inverted yoke having an upper crosshead portion and a pair of generally parallel side arms depending from the opposite ends of said cross-head portion, and said means mounting the basket for rotation about a generally horizontal axis includes axle means interconnected between the basket and the lower free end portions of said arms.

10. A brailer according to claim 9, wherein the means for rotating the basket comprises a rotary motor mounted on said yoke frame above the basket, said motor having an output shaft in parallelism with said axle means, and drive means drivenly connecting said output shaft to said basket.

References Cited

UNITED STATES PATENTS

| | | | |
|---|---|---|---|
| 264,395 | 9/1882 | Wilson | 43—13 |
| 301,653 | 7/1884 | Williams | 43—13 |
| 748,654 | 1/1904 | Roberts | 43—13 |
| 1,659,413 | 2/1928 | Suarez | 43—13 |
| 3,089,274 | 5/1963 | Dethloff | 43—4.5 |
| 3,113,394 | 12/1963 | Puretic | 43—6.5 |

WARNER H. CAMP, Primary Examiner